United States Patent [19]
Barnett et al.

[11] Patent Number: 5,422,933
[45] Date of Patent: Jun. 6, 1995

[54] METHOD AND SYSTEM FOR EFFECTING HANDOFF IN A CELLULAR COMMUNICATION SYSTEM

[75] Inventors: Charles A. Barnett, Sterling, Va.; Stanley E. Kay, Rockville, Md.; Lou King, Mt. Airy, Md.; Ashok D. Mehta, North Potomac, Md.

[73] Assignee: Hughes Aircraft Compnay, Los Angeles, Calif.

[21] Appl. No.: 118,560

[22] Filed: Sep. 9, 1993

[51] Int. Cl.$^6$ .......................................... H04M 11/00
[52] U.S. Cl. ...................................... 379/60; 455/33.2
[58] Field of Search ....................... 379/58, 59, 60, 63; 455/33.2, 54.1, 56.1, 62

[56] References Cited
U.S. PATENT DOCUMENTS

4,613,900 9/1986 Halpern .............................. 455/33.2

Primary Examiner—Scott A. Rogers
Assistant Examiner—Thomas L. Stoll
Attorney, Agent, or Firm—Gordon R. Lindeen, III; Wanda K. Denson-Low

[57] ABSTRACT

A method and system for handing off an on-going communication from a serving cell to a neighboring cell of a cellular communication system having scanning receivers associated with each base transceiver station. A dynamic threshold is calculated for effecting the handoff in accordance with various operating conditions. The current mobile minimum attentuation level, (MT) the minimum permissible attenuation level of a serving (MS) cell and a neighboring cell (MN), together with the RF signal strength of the mobile unit at the neighboring cell (RSSI-NBR) and the serving cell (RSSI-SRV) are used in calculating a dynamic threshold (RSSI-THP).

22 Claims, 6 Drawing Sheets

METHOD AND SYSTEM FOR EFFECTING HANDOFF IN A CELLULAR COMMUNICATION SYSTEM

BACKGROUND OF THE INVENTION

1. Field of Invention

The present invention relates to cellular communication systems; and more particularly to a method and system for effecting handoff of an on-going communication from a serving cell to a neighboring cell using scanning receivers at cell base stations.

2. Description of Related Art

A cellular communication system includes several base transceiver stations, each of which transmits and receives channels of RF information throughout a predetermined coverage area referred to as a cell. The outer boundary of a cell is determined not only by the effective radiated power of the base transceiver, which determines the maximum range at which a mobile unit is able to receive; but also, by the effective radiated power of the mobile telephones, which determines the maximum range at which the base station is able to receive. The base transceiver stations (BTS) determine their corresponding cell's handoff boundaries by setting an RF signal threshold value which must be met or exceeded by a mobile unit entering the cell in order to transfer an on-going call to that cell.

In many cellular installations, each BTS has several scanning receivers that periodically, or on command, measure the RF signal strength of selected traffic channels in order to determine the range of active mobile telephones relative to the transceiver of the cell in which the mobile telephone is located, referred to herein as a serving cell, and the proximity of the telephone to neighboring cells, which may or may not overlap the serving cell.

Based upon the received RF signal strength of the mobile unit by the transceiver of the serving cell, the BTS controls the effective radiated output power (ERP) of the mobile unit so that the transmission by the mobile unit does not saturate the base station transceiver when it is close to the center of the cell, but is of sufficient power to enable the BTS to receive the mobile transmission when it is far from the transceiver. When the RF received signal strength of a mobile unit received by the scanning receiver of a neighboring cell exceeds a fixed nominal RF signal threshold value that is configured into the system; then the system switches the on-going communication to a traffic channel of the neighboring cell, thus, effecting a handoff.

Because of variations in reception and transmission by the mobile units and the BTS at various locations in the cell, which may be caused by geographic phenomena, such as the terrain, or man made obstructions, for example, the scanning receivers are unable to determine the location of a mobile telephone; resulting in either improper or lost handoffs. Also, the use of low power mobile telephones, as well as the differences in size of contiguous cells causes problems in effecting handoffs. For example, if a mobile unit is within a large cell where a high power or low attenuation level of the mobile is permitted and moves toward a smaller cell where the power output is limited to a relatively high attenuation level, the mobile unit could be handed off to the smaller cell without actually being within the smaller cell. If the mobile unit is within a small cell, where the mobile units's minimum permissible attenuation level is high (low power output) and is moving toward a large cell where the mobile unit's minimum attenuation level is low (high power output), a handoff of the call could be lost. In installations that include microcells within the serving cells and a handoff to a microcell is required, the determination of the proper location may be inaccurate.

In light of the foregoing, there is a need for a method and system of handoff in a cellular communication system which overcomes the drawbacks and shortcomings hereinbefore mentioned.

SUMMARY OF THE INVENTION

Accordingly, the present invention is directed to a method and system of handoff that substantially obviates one or more of the problems of the related art.

Additional features and advantages of the invention will be set forth in the description which follows, and in part will be apparent from the description, or may be learned by practice of the invention. The objectives and other advantages of the invention will be realized and attained by the method and system, particularly pointed out in the written description and claims hereof, as well as the appended drawings.

To achieve these and other advantages and in accordance with the purpose of the invention, as embodied and broadly described, the invention is a method of handing off an on-going mobile telephone communication from a serving cell to a neighboring cell of a cellular communication system. The method includes handing off the communication to a neighboring cell at times when the RF signal strength of the mobile unit at the neighboring cell is greater than a determined cell selection threshold for the neighboring cell; and determining for each mobile unit the cell selection threshold in accordance with a current attenuation level of the mobile unit, a minimum attenuation level permitted by the serving cell, and a minimum attenuation level permitted by the neighboring cell.

In another aspect, the invention is a system for effecting handoff of a mobile telephone communication from a serving cell to a neighboring cell of a cellular communication system, having a plurality of mobile switching centers coupled to a telephone network, a plurality of base station controllers coupled to each mobile switching center, and a plurality of base transceiver stations, each defining individual cells, a plurality of scanning receivers for each base transceiver station for scanning traffic channels of neighboring cells. The system includes means for handing off the communication to a neighboring cell at times when the scanning receiver signal strength of the mobile units at the neighboring cell is greater than a cell selection threshold for the neighboring cell, and determining for each mobile unit a dynamic cell selection threshold in accordance with a current attenuation level of the mobile unit which is compared with a minimum attenuation level permitted by the serving cell and a minimum attenuation level permitted by the neighboring cell.

It is to be understood that both the foregoing general description and the following detailed description are exemplary and explanatory and are intended to provide further explanation of the invention as claimed.

The accompanying drawings, which are incorporated in and constitute a part of this specification, illustrate an embodiment of the invention, and together with the description, serve to explain the objects, advantages, and principles of the invention.

DESCRIPTION OF PREFERRED EMBODIMENT

Figure 1:
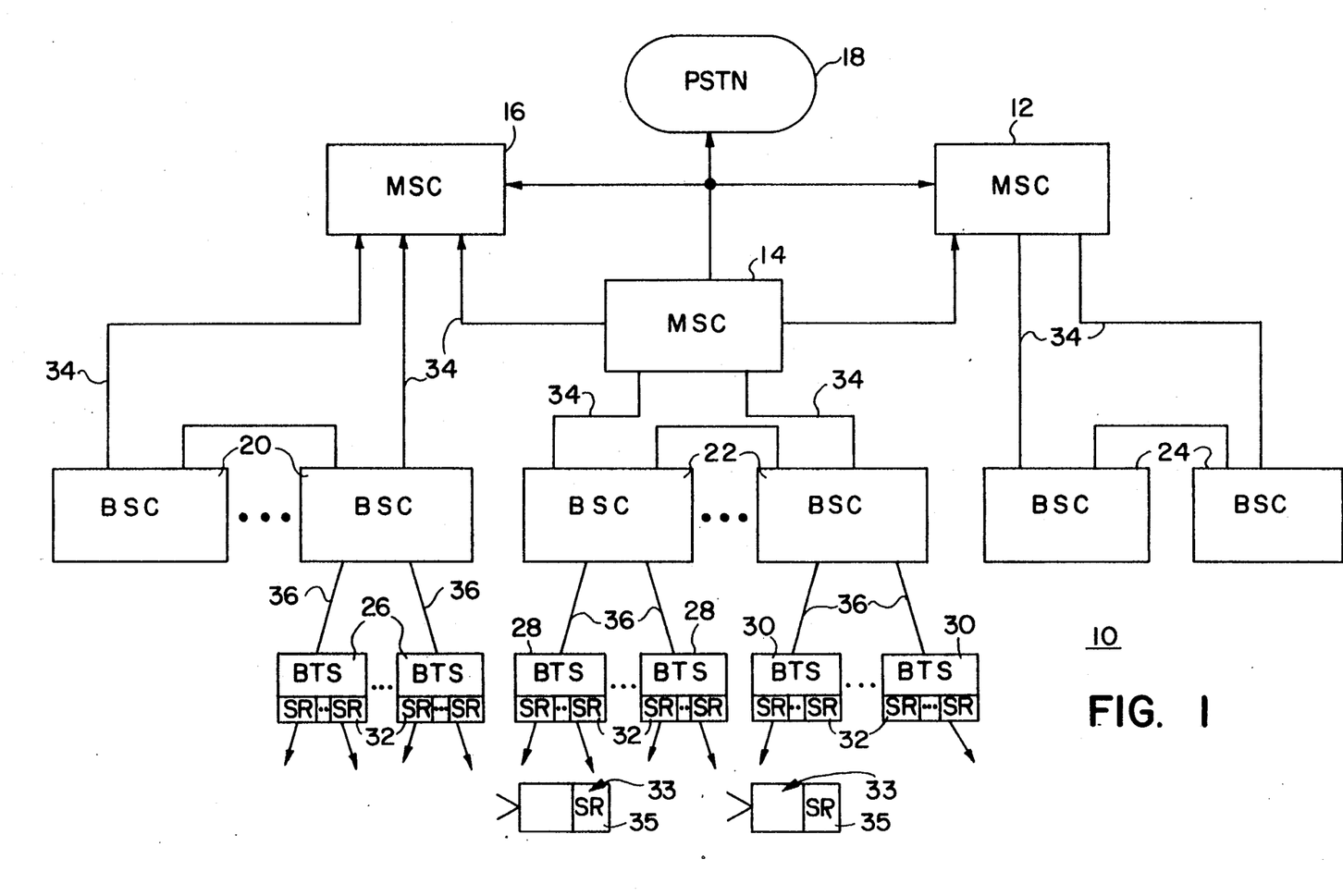
FIG. 1 is a block diagram of a cellular communication system incorporating the principles of the present invention.

A system for effecting handoff of an on-going mobile telephone communication from a serving cell to a neighboring cell is included in and is part of a cellular communication system as exemplified in FIG. 1, which system is generally referred to as 10.

Cellular system 10 has a plurality of mobile switching centers (MSC) 12, 14 and 16 which are connected to each other and to a public switched telephone network (PSTN) 18. Each of the MSC's is connected to a respective group of base station controllers (BSC), each group being referred to as 20, 22 and 24. Each BSC is connected to a group of individual base transceiver stations (BTS) referred to as 26, 28, and 30 respectively. Each BTS defines one or more individual cells of the communication system.

Each BTS of the groups 26, 28, and 30 includes hardware and software functions required to communicate over the radio channels of the system; and includes transmitters and receivers for communication with the mobile telephone units. Each BTS also includes a plurality of individual scanning receivers (SR) referred to at 32 for scanning selected traffic channels. Each BTS also includes digital multiplex equipment for transmission of audio traffic to its associated BSC.

Each BSC of group 20, 22, and 24 implements audio compression/decompression and handles call establishment, disconnect, and handoff procedures, and allocates system resources between the individual BTS's associated with a particular BSC. More specifically, each BSC performs handoff execution for transferring on-going communications from one cell to another within the group of BTS's connected to the particular BSC. Each BSC communicates with its associated MSC for effecting a handoff involving a cell or BTS associated with a different BSC.

Each MSC 12, 14, and 16 processes all requests for calls, switching functions, as well as the mobility functions of registration, authentication and handoff. Each MSC includes a home location register (HLR), which is a permanent data base of all subscribers and a visitor location register (VLR), which is a semi-permanent data base for users who are recently active in the area served by the MSC.

Figure 2:
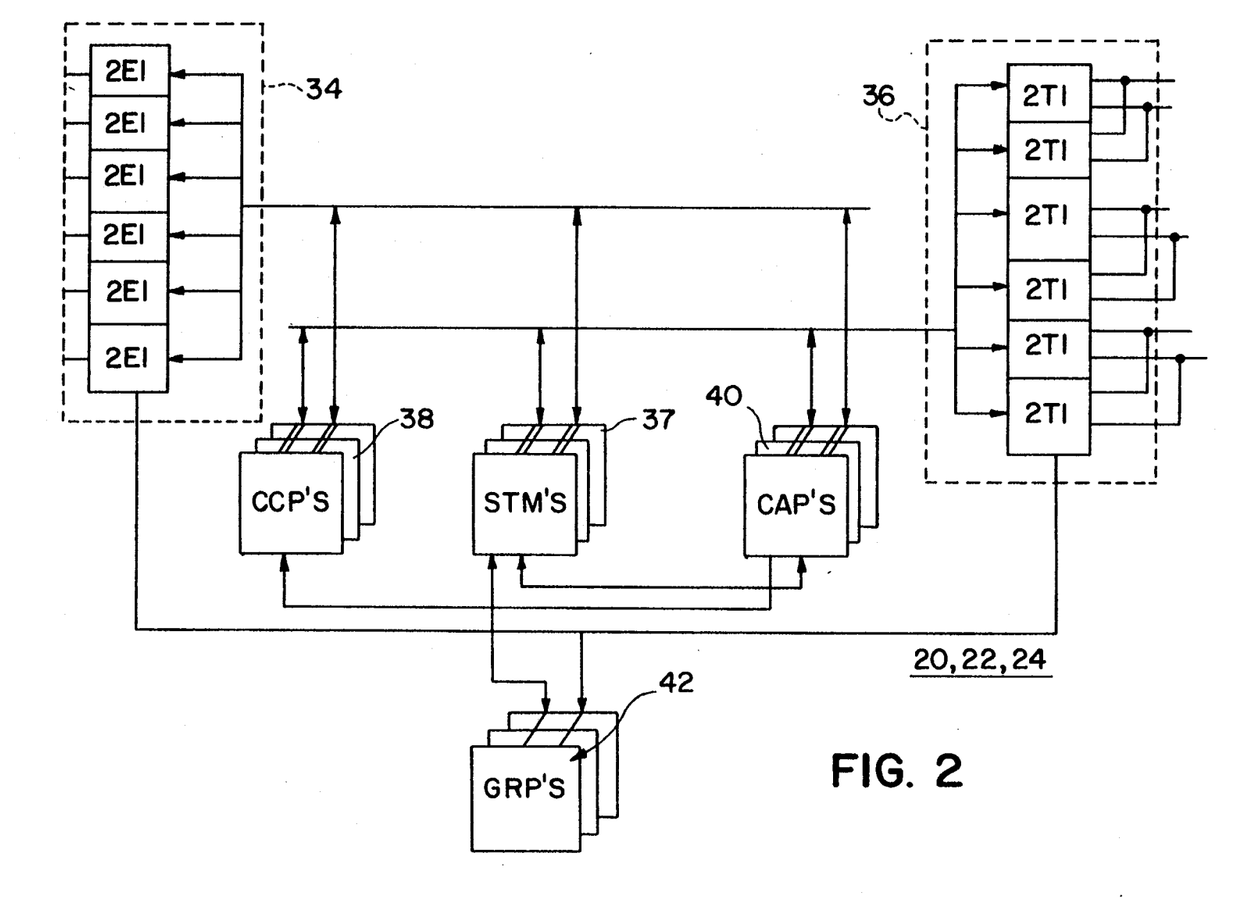
FIG. 2 is a diagram of a base station controller utilized in carrying out the present invention.

Referring to FIG. 2, each BSC 20, 22 and 24 includes trunk interfaces 34 to its associated MSC and trunk interfaces 36 to its associated BTS. Also, each BSC includes a switching and transcoding module (STM) 37.

Additionally, each BSC is made up of three types of control processors, which are implemented in identical hardware modules 38, 40, and 42.

Module 38 is a call control processor (CCP). In addition to switching of pulse code modulation (PCM) traffic between trunks 34 and 36 for analog traffic, it terminates call protocol for mobile switching, such as fast analog control channel (FACCH)/slow analog control channel (SACCH) processing and handoff execution. CCP also communicates with MSC for handoff execution. It also performs connection control and mobility management for handoff execution as hereinafter described in detail. For digital configurations there can be more than one CCP for each BSC. When there is more than one CCP per BSC, calls are distributed among CCP's based upon load. The number of CCP's depend upon load and redundancy requirements.

Hardware module 40, which is a channel access processor (CAP), is required only for digital configurations and performs voice channel allocations and deallocations and forwards power and time alignment measurements to the CCP's.

Hardware module 42 is a global resource processor (GRP) that distributes calls among the CCP's based on load; and communicates with other BSC's for scanning receiver measurements. That is, a GRP communicates with another BSC to exchange messages relating to scanning receiver (SR) measurements, and each GRP also communicates with scanning receivers located in a BTS controlled by the BSC in which the particular GRP is located.

Figure 3:
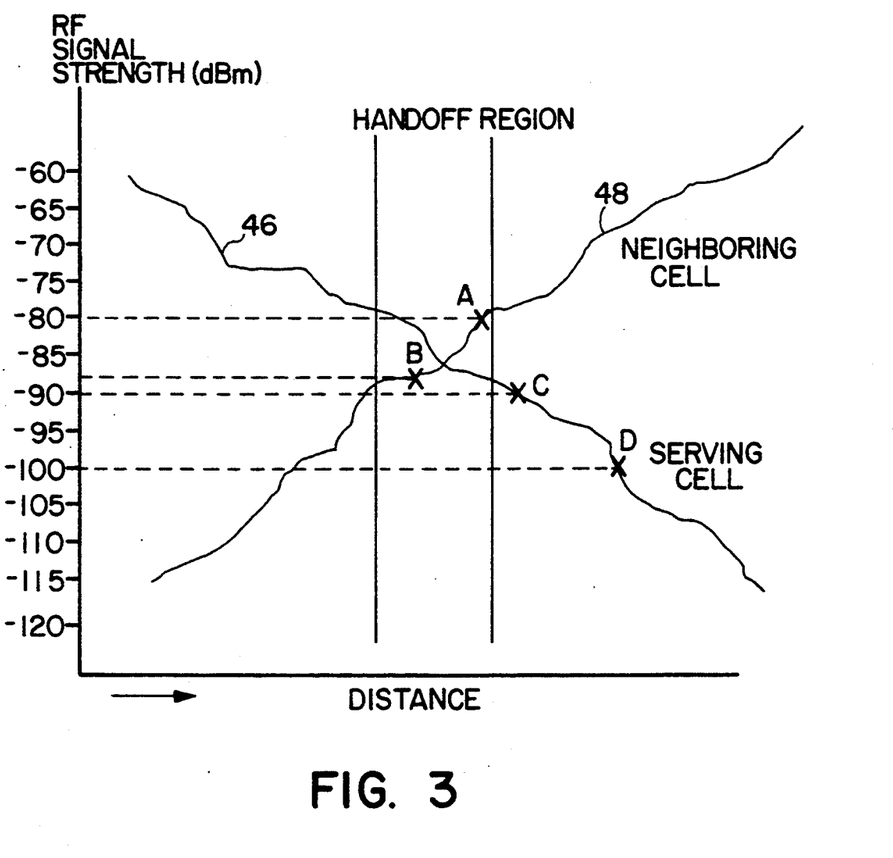
FIG. 3 is a diagram illustrating the relative RF signal strengths of a handoff region.

Referring to FIG. 3, typically, the signal strength of a particular cell may range from minus forty dBm at the center of a cell to minus one hundred twenty dBm beyond the boundary of the cell. Assuming that a mobile unit is traveling outwardly from a serving cell in the direction of the arrow, the signal strength of the mobile unit at the base station of the serving cell decreases as indicated by line 46. The signal strength of the neighboring cell, of course, increases at the mobile unit as it travels out of the serving cell as indicated by line 48. In calibrating the RF signal strength of the nominal threshold RF signal strength measurement calibration is carried out at both the neighboring cell and the serving cell as a mobile unit travels in the direction of the arrow. The mobile unit is set at the minimum permissible attenuation level for the respective cells when the system is being calibrated. After completion of the calibration, a diagram similar to FIG. 3 may be plotted; and a point can be selected at a level where adequate signal quality can be maintained while at the same time minimizing RF interference in the cellular network.

There are two fixed thresholds to be considered when calibrating the system; the first is a measurement threshold where the serving cell commences handoff measurement. The second threshold is the fixed nominal handoff cell selection threshold at which the mobile unit is transferred from the serving cell to the neighboring cell. The measurement threshold is chosen so that a call does not keep handing off back and forth between cells. Assume that the handoff cell selection threshold RF signal strength is point A of FIG. 3, which is approximately minus eighty dBm, then the RF signal strength of the measurement threshold may be at point B between minus eighty-five and ninety dBm. A critical handoff threshold may be chosen at point D, for example, and the handoff measurement of the neighboring cell, might be chosen to be point C, for example. According to the present invention, it is the cell selection threshold which is dynamically adjusted, and not the measurement or critical threshold.

There are several different types of mobile telephones, which are classified in accordance with their power output, for example. When a mobile unit establishes a call, its class is recognized and the BSC or BTS controls the unit at a particular attenuation level, which may or may not be substantially less than its maximum power output depending on its distance from the BTS and the power output of the mobile unit. In one preferred embodiment, a mobile unit may be commanded by a BTS or BSC to operate on any one of eight attenuation levels with each increment corresponding to 4 dB, for example. Thus, when a low or lowest attenuation level is referred to herein, a high or highest power output of the mobile unit is presumed; and when a high or highest attenuation level is referred to herein, the low or lowest power output of the mobile unit is presumed.

Referring again to FIG. 1, and FIG. 3, there are basically two types of scanning receivers, digital and analog. These scanning receivers support three different modes of operation, namely one shot emergency, one shot, and continuous measurement. For one shot emergency mode and one shot mode, a single scan is performed on specified traffic channels for a predetermined duration. For example, a one shot emergency scan occurs when the RF signal strength of a particular mobile unit falls below the critical threshold D (see FIG. 3). A one shot scan occurs at times when the RF signal strength of a mobile unit falls below the measurement threshold. For the continuous mode, scans are performed by the scanning receivers during a defined period following a request from the associated BSC based upon a particular operating condition. The continuous scans are performed repeatedly until the defined duration is exceeded, the reported operating condition is met, or a stop scan request is received from an associated BSC. Thus, the scanning receivers maintain three measurement lists, the one shot emergency, which is the highest priority, the one shot, the next highest, and the continuous measurement list, which is the lowest priority list.

Prior to describing in detail the exemplary embodiment of that portion of the system and method for effecting the handoff from a serving cell to a neighboring cell, an explanation and detailed description of the meaning of the letter designations is set forth in order to aid in understanding the present invention.

The designation RSSI-SRV refers to the RF signal strength of a mobile unit operating in a serving cell and measured by the serving cell. This signal also may be the traffic channel RF signal strength of the mobile unit in the serving cell.

The designation RSSI-NBR refers to the RF signal strength of the mobile unit transmit signal as detected by the scanning receiver of the neighboring cell.

The designation RSSI-TH refers to a nominal cell selection threshold for an individual cell. This nominal threshold is permanently configured into the system and may be determined as hereinafter described. RSSI-THP refers to a dynamic cell selection threshold level having a value that is determined in accordance with the present invention.

The value of the dynamic threshold RSSI-THP is predicated on several different parameters based on different operating conditions. Where appropriate RSSI-THP is referred to as a first, a second, or third dynamic threshold, for example. This designation refers to the different sets of parameters on which the RSSI-THP is based and not necessarily to a different finite value.

The designation MS refers to the minimum attenuation level of a mobile unit permitted by a serving cell. This level or value is configured into the system and is determined by several factors depending on the geography of the cell. The designation MN refers to the minimum attenuation level of a mobile unit permitted by a neighboring cell. The designation MT refers to the attenuation level at which the mobile unit currently is operating. This level is controlled by and entered into the BSC of the serving cell.

The designation RSSI-H is a hysteresis value that is added to the RF signal strength of the serving cell when being composed with either RSSI-TH or RSSI-THP to prevent a ping pong effect. RSSI-H has a default value of 3 dB.

In accordance with the present invention, the scanning receiver processing is based upon various reporting conditions of the mobile unit, such as, for example, the mobile units current transmit attenuation level (MT), the minimum mobile transmit attenuation level permitted or allowed by the serving cell, (MS) the minimum mobile transmit attenuation level permitted by the neighboring cell, MN, the serving cells traffic channel RF signal strength measurement (RSSI-SRV), the neighboring cells scanning receiver RF signal strength measurement (RSSI-NBR), the neighboring cell RF signal strength hysteresis (RSSI-H), and the neighboring cell handoff cell selection threshold (RSSI-TH).

The parameters used in handing off the on-going mobile communications in accordance with the present invention are either listed in the BSC where they relate to a status or a design of the system, or calculated in the BSC based on measurements taken during each scan. The transmitter attenuation level of a mobile unit MT for a particular channel which is an attenuation level that has been commanded by the BSC as determined by the RSSI-SRV of the forward or reverse traffic channel, is also listed in the associated BSC. The minimum attenuation level of the mobile unit relates to the design of the mobile telephone, and is entered in the BSC when a particular unit either initiates or responds to a call. The minimum mobile transmit attenuation level allowed by a serving cell MS is listed in the associated BSC. A mobile unit shall not transmit at a power level higher than permitted by the minimum attenuation level as determined by the cellular boundaries.

Each BSC of a digital system maintains a list for its associated BTS's that includes the RSSI-SRV measured and computed for each active cell, RSSI-NBR measured at the scanning receiver, the RSSI-TH and the RSSI-H for all neighboring cells, as well as the MS and MN as previously defined. The BSC determines the MT. The hysteresis value RSSI-H is an empirically determined constant stored in each BSC and serves to provide stability and overcome the effects of system tolerances.

In accordance with the invention, a dynamic cell selection threshold RSSI-THP is calculated in accordance with a comparison between the current operating attenuation level of a mobile unit and the minimum permissible attenuation level of the serving cell or the minimum permissible attenuation level of the neighboring cell. As herein embodied, this threshold value is calculated in the BSC and BTS of the serving cell in accordance with several different operating conditions.

A more detailed description of the method and system of invention is provided herein in connection with a description of the operation. In describing the operation, reference will be made to FIGS. 4, 5, and 6 as appropriate.

Figure 4:
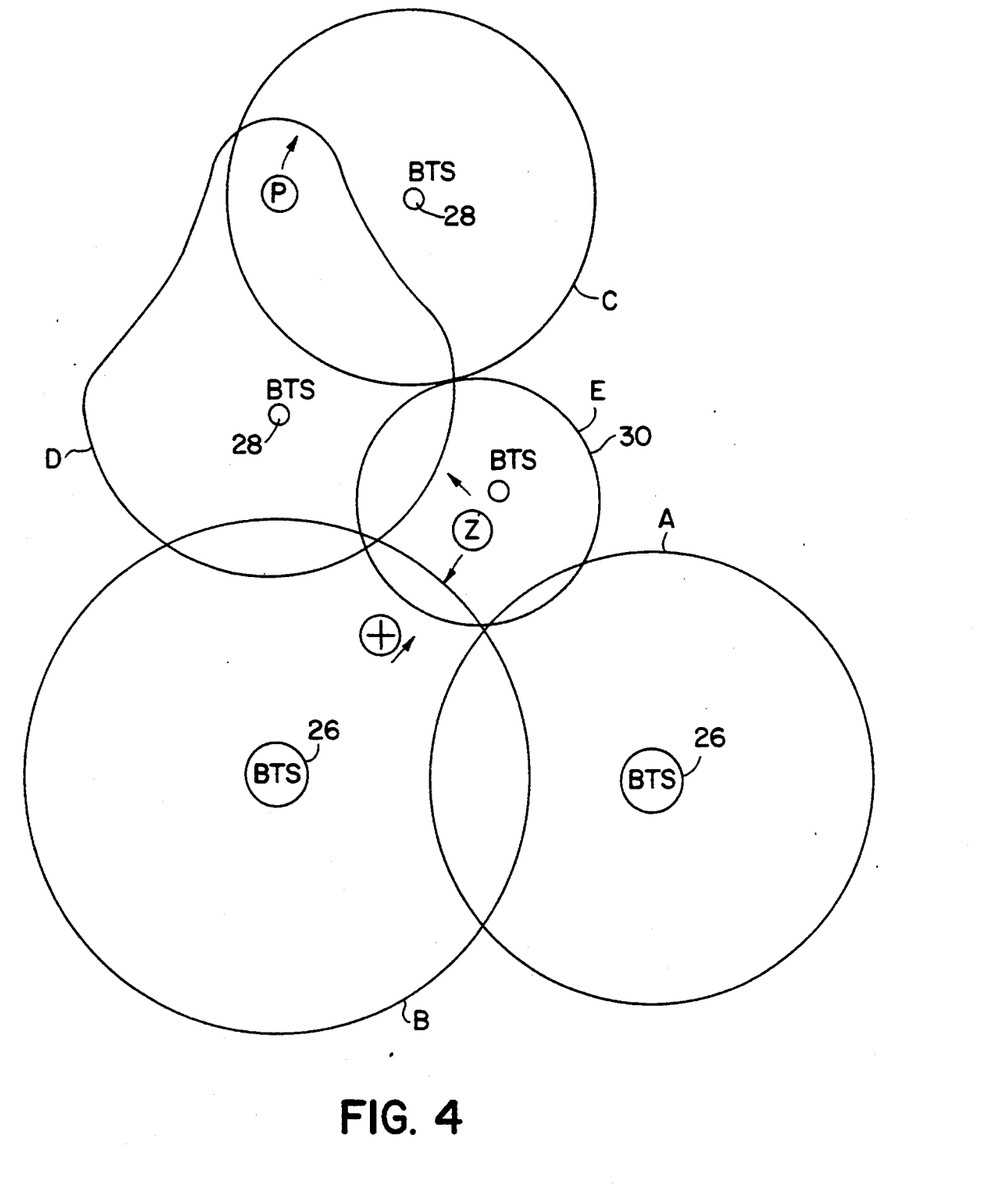
FIG. 4 is a diagram of a typical arrangement of overlapping cells of varying sizes.

Referring to FIG. 4, each of the circles represents a geographic boundary of an individual cell. For example, circle A and B may represent the boundary of a geographical area for a respective one of the BTS 26 (FIG. 1). Cell A and B are similar in area. Since cells A and B are relatively large, a low mobile attenuation level (high power) is permitted. Similarly, circle C and D may represent the boundaries of geographical areas covered by respective ones of BTS 28, for example. Cells C and D, though similar in size, cell D is assumed to be irregular because of terrain. Since cells C and D are slightly smaller than A and B, the cell is limited to a higher minimum permissible attenuation level. Cell E having BTS 28, for example, is substantially smaller than the other cells; and thus is limited to a higher permissible attenuation level than cells C and D. Each of the neighboring cells (A–E) overlap. Thus, each of the mobile units will at times occupy two adjacent cells when in the handoff region, as shown in FIG. 3.

Figure 5:
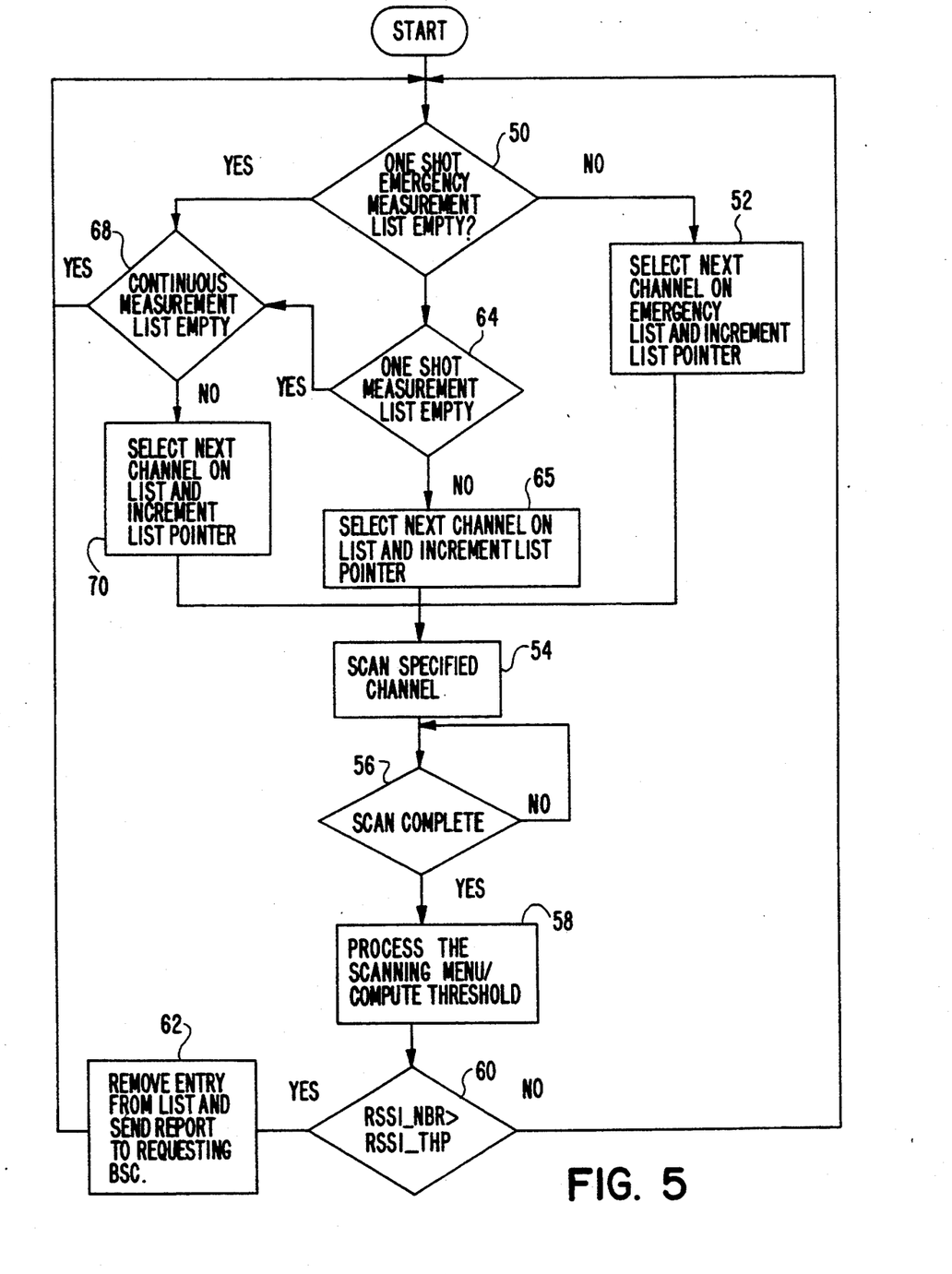
FIG. 5 is a flow chart illustrating a scanning sequence measurement according to one embodiment of the present invention.

Referring to FIG. 5, the measurements of the scans by the scanning receivers first checks the conditions that would correspond to the highest priority scan at step 50. If there is a handoff to be executed to a cell under this highest priority, the next communication channel on the emergency list is selected at step 52, and the channel is scanned at step 54. Once the scan is complete as indicated at step 56, the RSSI-TH or the RSSI-THP as the case may be, is computed based on the reporting criteria as hereinafter described. The threshold is then compared with the scanning receivers signal strength of the neighboring cell RSSI-NBR at step 60. If the signal strength RSSI-NBR does not exceed the appropriate threshold value, then the steps of the method are repeated. In the event that the cell selection threshold is exceeded, the measurement is removed from the emergency list at step 62 and the report is sent to the associated BSC. This procedure continues for all measurements on the emergency list until the list is empty. Then, the reporting conditions for the next priority, one shot, are checked at step 64. If there are measurements to be processed, the next channel on the list is selected at step 65; and the same steps are carried out as previously discussed in connection with the emergency list. After the processing of the measurements are completed at step 64, the continuous measurement list, which has the lowest priority for handing off is checked at step 68. Until there are no more measurements from this list to be processed as indicated at step 70, the method similar to that described in connection with the measurements of the emergency list at step 50 and the one-shot list at 64 are carried out.

In accordance with the present invention the mobile units current operating attenuation level, the minimum attenuation level permitted by the serving cell, and the minimum attenuation level permitted by a neighboring cell are used to arrive at a dynamic threshold which must be exceeded by the signal strength of the mobile unit measured by the scanning receiver of the neighboring cell in order to send a report to the BSC and remove the particular neighboring cell from the candidate list, for possible handoff.

Figure 6:
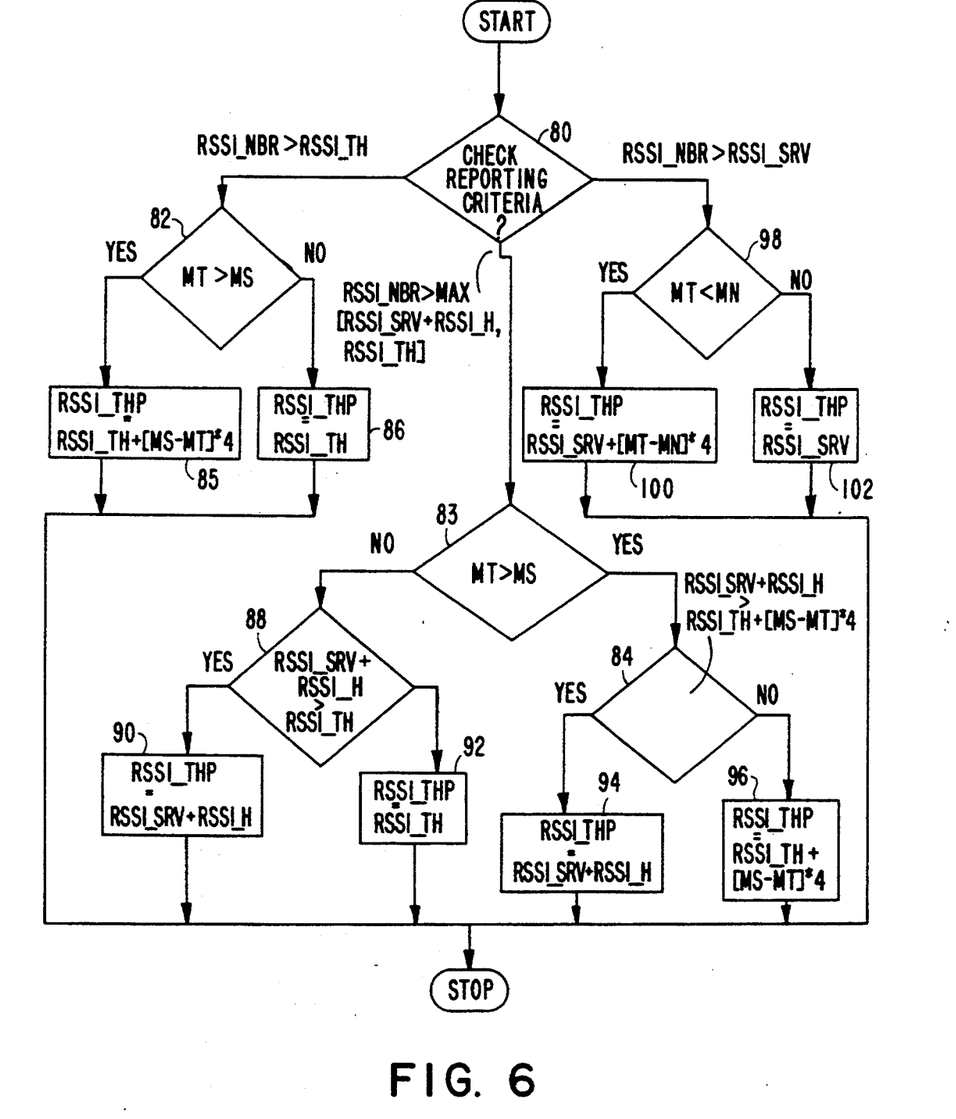
FIG. 6 is a flowchart illustrating the operating conditions and selection of a dynamic threshold value according to one embodiment of the present invention.

As embodied herein and referring to FIG. 6, when the RF signal strength of a mobile unit received by a neighboring cell is greater than the nominal threshold for such cell (RSSI-NBR>RSSI-TH), or the RF signal strength of a mobile unit received by the neighboring cell (RSSI-NBR) is greater than the RF signal strength of the serving cell (RSSI-SRV), or the RF signal strength (RSSI-NBR) is greater than the maximum of the sum of the signal strength of the traffic channel of the serving cell added to a hysteresis constant, and the nominal threshold value of the receiving cell (RSSI-NBR MAX>[RSSI-SRV+RSSI-H], and [RSSI-TH]) as determined at block 80, then the current operating attenuation level of the mobile unit MT is compared with the minimum permissible attenuation level of the serving cell MS at blocks 82 and 83 respectively, and the minimum permissible attenuation level of the neighboring cell MN at block 98. If the current operating attenuation level of the mobile unit MT is greater than MS at block 82, then a dynamic threshold RSSI-THP is calculated to correspond to the expression (RSSI-TH+[MS-MT]*4) at block 85. Should the value MT exceed the value MS as indicated at block 83 then the dynamic threshold value RSSI-THP as calculated at block 85 is compared with the RF signal strength of the traffic channel of the serving cell plus the hysteresis constant [RSSI-SRV+RSSI-H] at block 84.

In the event that MT does not exceed MS or in other words is equal to or less than MS at block 82, then the dynamic threshold RSSI-THP corresponds to the fixed nominal threshold RSSI-TH as indicated at block 86. In the event that MT does not exceed MS at block 83, then the nominal threshold value RSSI-TH is compared with the sum of the signal strength of the traffic channel in the serving cell plus the hysteresis constant [RSSI-SRV+RSSI-H].

In the event that the value [RSSI-SRV+RSSI-H] is greater than the nominal fixed threshold value at block 88, then the dynamic threshold RSSI-THP corresponds to the value [RSSI-SRV+RSSI-H] as indicated at block 90. In the event that [RSSI-SRV+RSSI-H] is not greater than the nominal threshold level at block 88, then the threshold RSSI-THP corresponds to the nominal threshold RSSI-TH at block 92.

In the event that the value [RSSI-SRV+RSSI-H] is greater than the first dynamic threshold at block 84 then the dynamic threshold RSSI-THP corresponds to the second dynamic threshold at block 94. In the event that the value corresponding to the second dynamic threshold is not greater than a value corresponding to the first dynamic threshold at block 84, then the dynamic threshold RSSI-THP corresponds to a dynamic threshold at block 96 corresponding to the nominal threshold level RSSI-TH plus the minimum permissible attenuation level of the neighboring cell MN subtracted from the minimum permissible attenuation level of the serving cell MS multiplied by the number of dBm per level.

For circumstances where the RF signal strength of the mobile unit received by the scanning receiver of the neighboring cell (RSSI-NBR) is greater than the RF signal strength of the traffic channel of the serving cell (RSSI-SRV) at box 80, but may not meet the criteria where RSSI-NBR is greater than the nominal threshold RSSI-TH, then the current operating attenuation level of the mobile unit MT is compared with the minimum permissible attenuation level of the neighboring cell MN at block 98. If MT is equal to or less than MN, then the dynamic threshold RSSI-THP corresponds to the dynamic threshold value calculated at block 100, which is the RF signal strength of the serving cell plus a value obtained when MT is subtracted from MN and the result multiplied by four. In the event that MT is not less than MN, then the dynamic threshold RSSI-THP corresponds to the RF signal strength of the serving cell RSSI-SRV at block 102.

In summary, there has been described a system and method that compensates for mobile units of different maximum output power and adjacent cells of different sizes, and shape. For example, referring to FIG. 4, assume that a mobile unit X is actively communicating while traveling from a large cell B to a smaller cell E, or in other words from a serving cell having a minimum mobile permissible mobile attenuation level less than the minimum attenuation level permitted by the neighboring cell E. Since, the serving cell B is much larger than the neighboring cell E, the scanning receivers signal strength RSSI-NBR is likely to exceed the X sum of the RSSI-SRV and RSSI-H. Thus, the X mobile's current transmit attenuation level MT is compared to the minimum transmit attenuation level allowed by the serving cell MS. If the current transmit attenuation level MT is equal to or less than the minimum allowable attenuation level of the serving cell MS, it is likely that the mobile unit X is at or near the boundary of the serving cell B. In such event there is no adjustment to the nominal threshold value RSSI-TH. If, however, the mobile unit is within the neighboring cell, RSSI-NBR may be greater than RSSI-THP. If the mobile unit is well within the serving cell, then no handoff will take place since RSSI-NBR will be less than RSSI-THP.

However, if the mobile current transmit attenuation level MT is greater than MS, the minimum allowable attenuation level of the serving cell, which indicates that the mobile unit X is either a low power unit or is transmitting at a lower than permissible power MS, a different threshold value RSSI-THP is calculated as shown by block 85. Since the difference in attenuation levels MT and MS is negative, the dynamic threshold RSSI-THP is reduced to less than the nominal threshold RSSI-TH, which accelerates the handoff. Handoff occurs when the scanning receiver signal strength of the neighboring cell RSSI-NBR becomes greater than the dynamic threshold level RSSI-THP.

Assume that a mobile unit Z is traveling from the small cell E to the larger irregular cell D as shown in FIG. 4, the scanning receiver signal strength RSSI-NBR is compared with RSSI-SRV while the mobile unit is within cell E, but closer to the BTS of E than the BTS of cell D. Since mobile unit Z is quite a distance from cell D and close to the center of cell E, RSSI-NBR may not exceed RSSI-SRV, but may exceed the threshold level RSSI-TH. In such event, the current transmit attenuation level MT is compared with the minimum allowable transmit attenuation level MS. Since E is a small cell, it is assumed that the mobile current transmit attenuation level MT is greater than the minimum permissible attenuation level MS of cell E, and handoff occurs when RSSI-NBR>RSSI-THP.

When RSSI-NBR is greater than RSSI-SRV but not greater than RSSI-TH, then the nominal threshold RSSI-TH is not used in arriving at the calculated threshold RSSI-THP regardless of the relative attenuation level of the mobile unit or the attenuation level permitted by the neighboring cell.

As a final example, assume that a low power mobile unit P is traveling in an irregular portion of cell D toward cell C. In this instance, the current attenuation level MT is greater than the permissible minimum attenuation level MS of the serving cell, and a dynamic threshold is calculated at block 85 to accelerate the handing off as previously described.

Having described the present preferred system embodiment and method of the invention, additional advantages and modifications will readily occur to those skilled in the art. Accordingly, the invention in its broader aspects is not limited to the specific details, representative apparatus, and illustrative examples as shown and described. Departure may be made from such details without departing from the spirit or scope of the general inventive concept as defined by the appended claims and their equivalents.

What is claimed is:

1. A method of handing off an on-going communication of a mobile unit from a serving cell to a neighboring cell of a cellular communication system, comprising:
   handing off the communication to a neighboring cell at times when the scanning receiver signal strength of the mobile unit at the neighboring cell is greater than a determined cell selection threshold for the neighboring cell; and
   determining the cell selection threshold using the current attenuation level of the mobile unit, a minimum permissible attenuation level permitted by the serving cell, and a minimum permissible attenuation level permitted by the neighboring cell.

2. The method of claim 1 wherein the step of determining the cell selection threshold, comprises the substeps of:
   determining the cell selection threshold at times when the current attenuation level of the mobile unit is greater than the minimum attenuation level permitted by the serving cell, and
   reporting the neighboring cell to the base station controller at times when an RF signal strength of the mobile unit at the neighboring cell exceeds the determined cell selection threshold.

3. The method of claim 1 wherein the step of determining the cell selection threshold, comprises the substeps of
   determining the cell selection threshold at times when the current attenuation level of the mobile unit is less than the minimum attenuation level permitted by the neighboring cell; and
   reporting the neighboring cell to the base station at times when an RF signal strength of the neighboring cell exceeds the determined cell selection threshold.

4. The method of claim 2 wherein the step of determining the cell selection threshold comprises the substeps of calculating the threshold to correspond to a value representing the minimum attenuation level permitted by the serving cell less the current attenuation level of the mobile unit combined with the nominal threshold.

5. The method of claim 3 wherein the step of determining the cell selection threshold comprises the substep of
   determining the threshold to correspond to the RF signal strength of the traffic channel of the serving cell plus the current mobile attenuation level subtracted from the minimum attenuation level permitted by the neighboring cell.

6. The method of claim 1 wherein the step of determining the cell selection threshold comprises the substeps of utilizing the nominal cell selection threshold at times when the current mobile attenuation level is not greater than the minimum attenuation level permitted by the serving cell.

7. The method of claim 3 wherein the step of determining the cell selection threshold, comprises the substeps of:
utilizing a value corresponding to the traffic channel RF strength of the serving cell as the cell selection threshold at times when the current mobile unit attenuation level is not less than the minimum attenuation level permitted by the neighboring cell.

8. The method of claim 2 wherein the step of determining the cell selection threshold comprises the substep of determining the cell selection threshold to correspond to the value of the RF signal strength of the traffic channel plus a hysteresis constant.

9. The method of claim 8 wherein the substep of determining the selected cell threshold occurs at times when the RF signal strength of the serving cell plus the hysteresis constant is greater than a threshold value that correspond to the nominal threshold value plus the minimum attenuation level permitted by the serving cell less the current attenuation level of the mobile unit.

10. The method of claim 1 wherein the step of determining the cell selection threshold, comprises the substeps of:
determining the cell selection threshold at times when the current attenuation level of the mobile unit is not greater than the minimum attenuation level of the serving cell; and
reporting the neighboring cell to the base station controller at times when an RF signal strength of the neighboring cell exceeds the determined cell selection threshold.

11. The method of claim 10 wherein the step of determining the cell selection threshold comprises the substeps of determining the threshold to correspond to a value represented by the traffic channel signal strength of the serving cell plus the hysteresis constant at times when the determined threshold is greater than the nominal cell selection threshold.

12. A system for effecting handoff of a mobile telephone communication from a serving cell to a neighboring cell of a cellular communication system having a plurality of mobile switching centers coupled to a telephone network, a plurality of base station controllers coupled to each mobile switching center, and a plurality of base transceiver stations, each defining an individual cell, and a plurality of scanning receivers for each base transceiver station for scanning neighboring cells, the system comprising:
means for handing off the communication to a neighboring cell at times when the scanning receiver signal strength of the mobile unit at the neighboring cell is greater than a cell selection threshold for the neighboring cell; and
means for determining the cell selection threshold in accordance with a current attenuation level of the mobile unit, as compared to a minimum attenuation level permitted by the serving cell and a minimum attenuation level permitted by the neighboring cell.

13. The system of claim 12 wherein the means for determining the cell selection threshold, comprises:
means for determining the cell selection threshold at times when the current attenuation level of the mobile unit is greater than the minimum attenuation level permitted by the serving cell, and
means for reporting the neighboring cell to the base station controller at times when an RF signal strength of the mobile unit at the neighboring cell exceeds the determined cell selection threshold.

14. The system of claim 12 wherein the means for determining the cell selection threshold, comprises:
means for determining the cell selection threshold at times when the current attenuation level of the mobile unit is less than the minimum attenuation level permitted by the neighboring cell; and
means for reporting to the base station controller at times when an RF signal strength of the neighboring cell exceeds the determined cell selection threshold.

15. The system of claim 13 wherein the means for determining the cell selection threshold includes means for calculating the threshold to correspond to a value representing the current attenuation level of the mobile unit subtracted from the minimum attenuation level of the serving cell combined with a filed nominal threshold.

16. The system of claim 14 wherein the means for determining the cell selection threshold comprises:
means for calculating the threshold to correspond to the RF signal strength of the traffic channel of the serving cell plus the current mobile attenuation level subtracted from the minimum attenuation level permitted by the neighboring cell.

17. The system of claim 12 wherein the means for determining the cell selection threshold comprises, means for utilizing the nominal cell selection threshold at times when the current mobile attenuation level is not greater than the minimum attenuation level permitted by the serving cell.

18. The system of claim 14 wherein the step of determining the cell selection threshold, comprises:
means for utilizing a value corresponding to the traffic channel RF strength of the serving cell as the cell selection threshold at times when the current mobile unit attenuation level is not less than the minimum attenuation level permitted by the neighboring cell.

19. The system of claim 13 wherein the means for determining the cell selection threshold comprises means for calculating the cell selection threshold to correspond to the value of the RF signal strength of the traffic channel plus a hysteresis constant.

20. The system of claim 19 wherein the means for calculating the cell selection threshold occurs at times when the RF signal strength of the serving cell plus the hysteresis constant is greater than a threshold value that corresponds to the nominal threshold value plus the minimum attenuation level permitted by the serving cell less the current attenuation level of the mobile unit.

21. The method of claim 12 wherein the means for determining the cell selection threshold, comprises:
means for determining the cell selection threshold at times when the current attenuation level of the mobile unit is not greater than the minimum attenuation level permitted by the serving cell; and
means for reporting the neighboring cell to the base station controller at times when an RF signal strength of the neighboring cell exceeds the determined cell selection threshold.

22. The system of claim 21 wherein the means for determining the cell selection threshold comprises means for calculating the threshold to correspond to a value represented by the traffic channel signal strength of the serving cell plus the hysteresis constant at times when the calculated threshold is greater than the nominal cell selection threshold.

* * * * *